United States Patent [19]
Anderson

[11] Patent Number: 5,641,055
[45] Date of Patent: Jun. 24, 1997

[54] CONVEYOR BELT

[75] Inventor: Paul S. Anderson, Astoria, Oreg.

[73] Assignee: Carruthers Equipment Co., Warrenton, Oreg.

[21] Appl. No.: 498,642

[22] Filed: Jul. 6, 1995

[51] Int. Cl.[6] .................................................. B65G 21/10
[52] U.S. Cl. .................................... 198/631.1; 198/434
[58] Field of Search ............................... 198/494, 498, 198/631.1, 434; 209/308, 695

[56] References Cited

U.S. PATENT DOCUMENTS

| | | | |
|---|---|---|---|
| 103,086 | 5/1870 | Russell et al. | 209/308 |
| 1,255,963 | 2/1918 | Washburn. | |
| 1,408,969 | 3/1922 | Aspinwall | 209/308 |
| 1,459,854 | 6/1923 | Nelson | 209/308 |
| 1,758,603 | 5/1930 | Helenbolt. | |
| 1,814,992 | 2/1931 | Wheeler | 209/308 |
| 1,990,227 | 2/1935 | Fairchild. | |
| 2,603,144 | 7/1952 | Floyd. | |
| 2,688,394 | 9/1954 | Hurd. | |
| 2,743,004 | 4/1956 | Wright | 198/631.1 |
| 4,703,846 | 11/1987 | Salminen et al. | 198/631.1 |
| 4,911,827 | 3/1990 | Ryan et al. | 209/308 |

*Primary Examiner*—Joseph E. Valenza
*Attorney, Agent, or Firm*—Robert L. Harrington

[57] ABSTRACT

A conveyor belt including displacement apparatus for laterally displacing pieces of a product across the width of the moving conveyor belt. The apparatus may include a rotatable paddle wheel with radially extending fins or roller sets that are engageable with the underside of the belt. The paddle wheel is rotated to rapidly elevate the belt upwardly and downwardly to project the pieces off the belt in a trajectory that will displace the pieces laterally relative to the direction of travel of the belt. In a preferred embodiment, the fins or roller sets are tapered such that the center of the belt has the greatest upward (and downward) movement and the belt near its side edges has the least movement.

8 Claims, 5 Drawing Sheets

CONVEYOR BELT

FIELD OF THE INVENTION

This invention relates to the displacement of product particles on a conveyor belt, e.g., spreading food product particles wherein the particles enter the conveyor on a relatively narrow center portion of the conveyor and it is desirable to spread the particles substantially across the width of the conveyor belt before depositing them off the conveyor.

BACKGROUND OF THE INVENTION

Conveyors are used to transport various food and other products between processing stations which require the product to be taken from a narrow conveyor to a wider conveyor or the reverse case wherein the product must be spread, singulated, transferred or converged. Prior art used in accomplishing this includes vibratory conveyors which utilize a stationary plate that is vibrated causing a random flow and separation of product which is caused by each unit of product colliding with others causing a random singulation and spreading as a result of the vibration. Alternatively, scraper bars or rake type devices are used to spread product on belt type conveyors. Inherent in each of these methods of locating product on conveyors are the random nature of the location of the product on the conveyor and difficulties with hygiene and product flow caused by product build up on the vibratory conveyor or scraper. This is particularly difficult when transporting product that is not naturally free flowing or granular in nature which may be sticky in nature and subject to product build up, such as raw or cooked meats or leafy vegetables.

In a specific application, it is desirable to slice meat into cubes and then separate the cubes by fat content. An apparatus has been developed for automatically slicing meat products into cubes, e.g., of ½ thickness with the cubes spread over, e.g., a 30" width but in a crowded condition. A machine has also been developed for scanning such meat cubes but in a separated condition, e.g., over a 50" width spacing with air jets strategically placed to separate the cubes by fat content. The present invention deals with the problem of converting the 30" width of crowded cubes to a 50" width of uncrowded cubes during the transfer process from the machine used to slice the cubes, to the machine used to separate the cubes by fat content. The disclosure in general will be directed to this specific problem but it will be appreciated that the invention has application to other similar concerns for displacing particles on a conveyor.

BRIEF DESCRIPTION OF THE INVENTION

Having reference again to the specific application discussed above, meat cubes provided on a conveyor do not readily slide and conventional vibrating techniques do not work. Also, it is desirable to spread the product evenly across the width of the belt, i.e., the crowded 30" width is to be spread evenly in an uncrowded condition across the full width of the 50" width transition conveyor belt. The following brief description relates to a preferred embodiment of the invention, i.e., as applied to spreading meat cubes.

A conveyor is constructed to support a belt of 50" width in a taut condition with sufficient room under the belt to mount a driven paddle wheel transverse to the path of conveyance. The peripheral edge of the wheel is convexly curved and centrally positioned under the belt and is arranged to engage or strike and lift the belt. At the center, the wheel edge extends upwardly past the point of engagement with the belt between one and two inches and tapers in the form of a curve to the sides of the belt. The total width engaged by the paddle wheel substantially covers the center portion of the belt on which the food product is carried, e.g., a distance of about 30".

The number of paddles on the wheel may vary as may be the rotational speed of the wheel, the height of the paddle and the configuration of the taper or curve. In the example here being discussed, the conveyor is driven at a high rate of speed, e.g., 240' per minute and it has been found that a three wheel paddle having a tip speed matched to the conveyor belt speed achieves the desired result.

It is not typically the objective to repeatedly bounce the food product to produce a shuffling motion of the food product toward the side. What is intended is the production of a limited and controlled number of bounces with the force vectors applied in a manner that sends the cubes air borne upwardly and laterally, the lateral vector having a small component at the apex and increasing along the curvature and toward the sides. The cubes in the center will receive the hardest bounce as the lifting force is the greatest at the center and again tapers off toward the sides.

The striking of the belt by the paddles is spaced, e.g., so that the belt can settle between paddle engagements and, of course, being in constant motion, a different section of the food product moves into position over the striking area. The extent of the impact and the frequency of the impact is established (controlled) to achieve the desired result. The speed of the belt versus the speed of the paddle wheel will vary depending on the food product being conveyed. A slower moving belt, e.g., 20 to 40' per minute will not be sufficiently impacted by a paddle wheel rotating to generate peripheral speed matching the speed of the belt. The paddle in such cases will be rotated at a faster rate. The frequency of impact may be spaced, e.g., using a two paddle wheel or even a one paddle wheel and the paddle edge may be provided as rollers to avoid scraping of the paddle wheel edge across the bottom of the belt. The distance from the paddle's edge to the center of rotation is also a factor to be considered.

Other applications in which the device may be used include transfer from/to IQF (instant quick freeze), roasting or sorting activities and/or where product requires acceleration or deceleration to accommodate smooth transition from conveyors traveling at significantly different speeds. Also, the device may be used to either spread, converge, transfer and/or singulate product. It may include a single station Or a series of stations where the degree of agitation provided from a single launch is not appropriate to the product being processed. Paddle height or profile as well as the relative speed of the paddle to the conveyor belt are adjustable to the needs of the process.

The invention will be more fully appreciated and understood upon reference to the following detailed description of the preferred embodiment and the accompanying drawings referred to in the description.

DESCRIPTION OF THE PREFERRED EMBODIMENT

Figure 1:
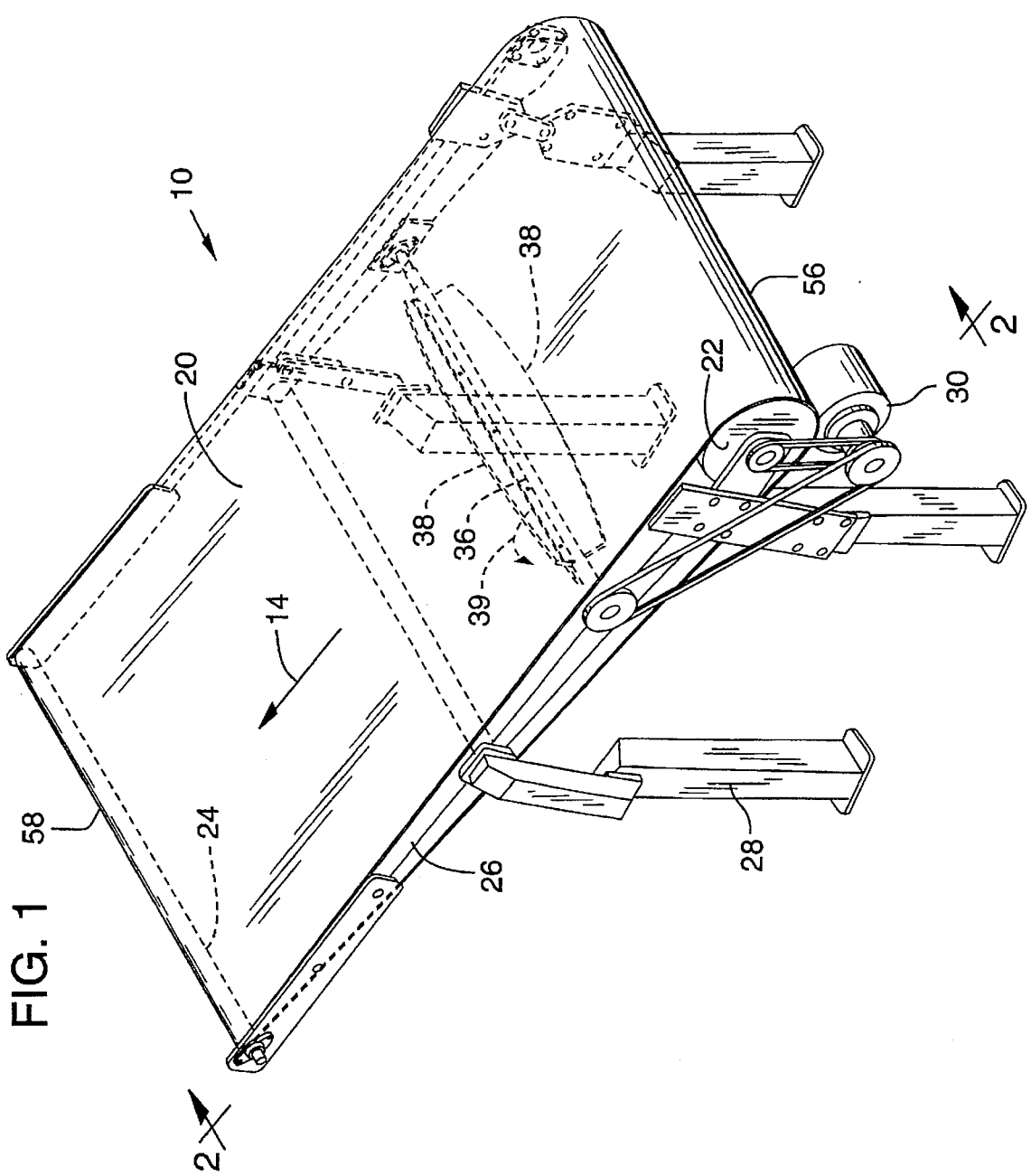
FIG. 1 is a perspective view of a conveyor belt spreader of the present invention.
Figure 3:
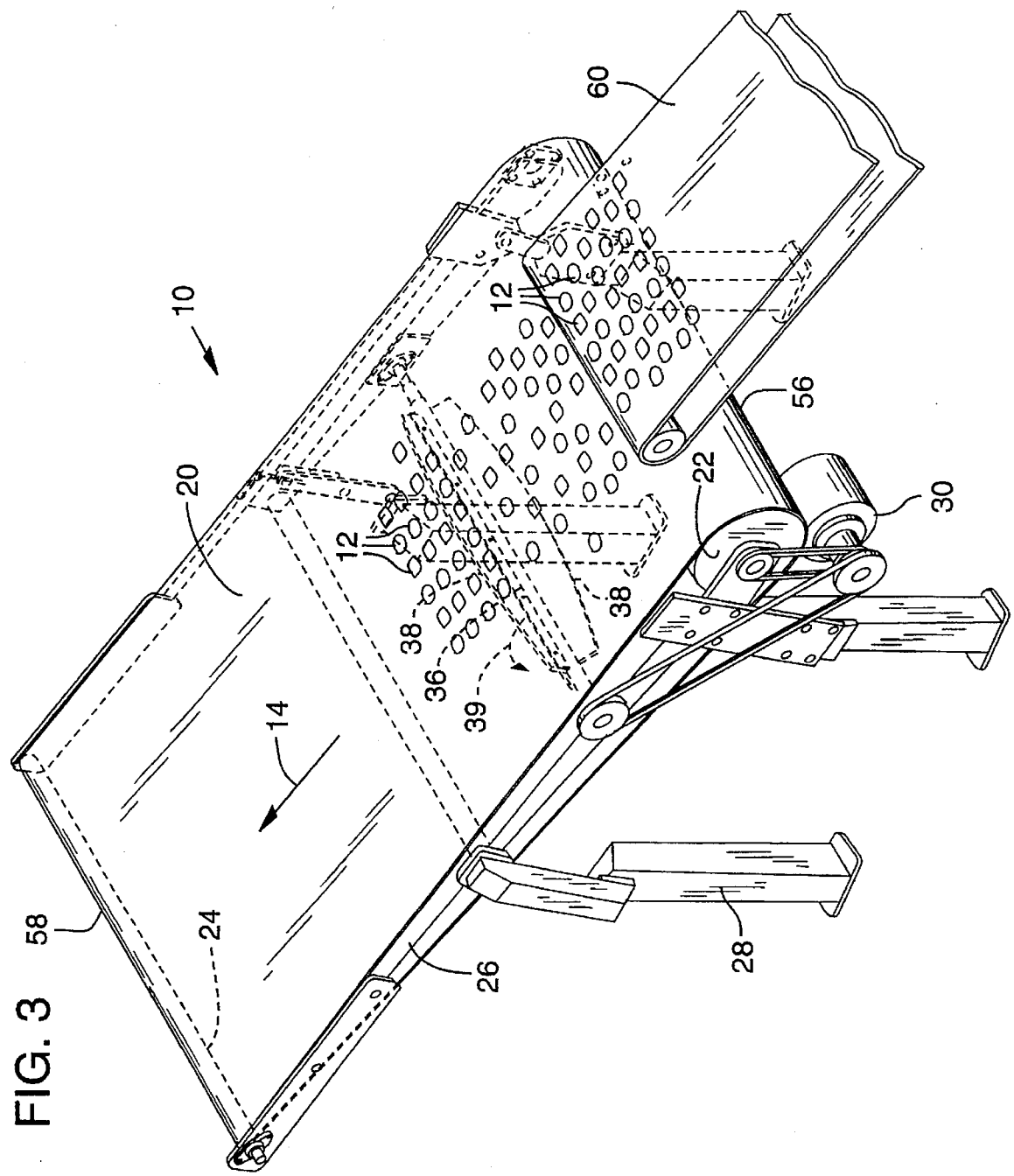
FIG. 3 is a view illustrating a product being laterally disbursed across the width of the belt as the product is conveyed along the length of the belt.

FIG. 1 illustrates a conveyor belt spreader 10 of the present invention. The spreader 10 will, as it conveys a product such as meat that has been sliced into cube-like portions 12, disburse or spread the portions 12 across the width of the spreader 10 as shown in FIG. 3.

The spreader 10 has a drive roll 22 and an idler roll 24 rotatively supported on a frame generally indicated by numeral 26. The frame 26 is mounted to and supported by a supporting frame 28. An endless belt 20 is entrained around the drive roll 22 and the idler roll 24 in a taut condition. The belt 20 entrained around the drive roll 22 and the idler roll 24 forms a loop. The drive roll 22 is driven by a motorized drive mechanism 30. The drive mechanism 30 is preferably of the type that may be varied. That is the output of the drive mechanism 30 may be varied to vary the rotation of the drive roller 22 and thus the rate of travel of the belt 20.

Figure 2:
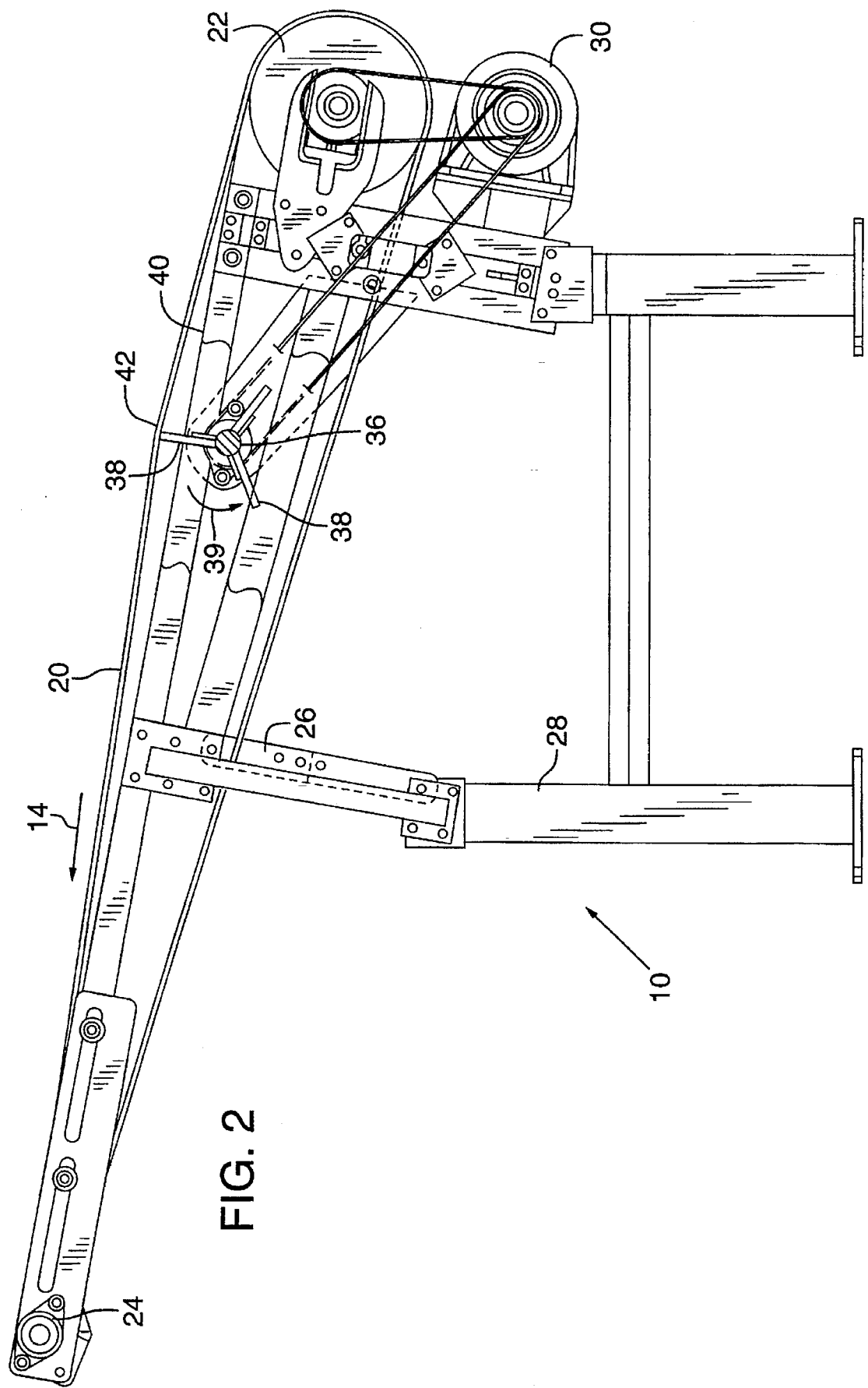
FIG. 2 is a view of the conveyor belt spreader of FIG. 1 as viewed on view lines 2—2 of FIG. 1.

In this embodiment, a multi-fin paddle (wheel) 36 is rotatably mounted to the frame 26 and is positioned within the loop formed by the belt 20. The drive roller 22 is sufficiently large in diameter such that the multi-fin paddle 36 may be fitted between the loop portion of the belt 20. The multi-fin paddle 36 is rotatably driven by the same drive mechanism 30 which drives the drive roller 22 and thus the belt 20. The multi-fin paddle 36 is driven at a rate such that its peripheral speed closely matches the rate of travel of the belt 20 when the spreader 10 is in operation. The matching of the peripheral speed of the paddle 36 with the travel rate of the belt 20 minimizes the abrasive effect between the belt and the paddle 36. The multi-fin paddle 36 is strategically positioned with respect to the belt 20 (as best seen in FIG. 2) so that the extending fins (paddles) 38 of the paddle 36 will, as the paddle is rotated, engage and lift the belt 20 from a position indicated by numeral 40 to a position indicated by numeral 42. Position 42 as shown in FIG. 2 illustrates the maximum position the belt 20 is elevated and is generally in the center of the belt 20.

Figure 6:
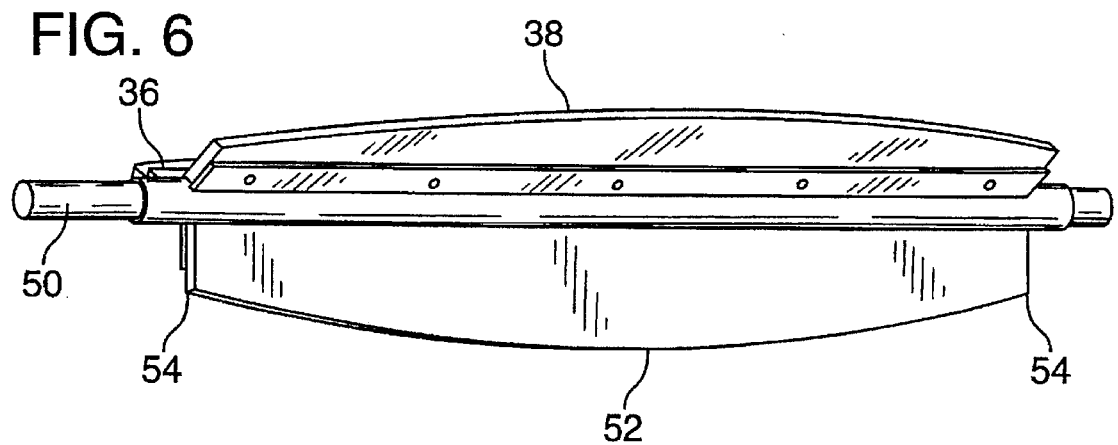
FIG. 6 is a view of a multi-fin paddle utilized in the conveyor spreader of FIG. 1.

The multi-paddle wheel 36 utilized in this embodiment is further illustrated in FIG. 6. As shown, the multi-fin paddle 36 has three extending fins 38 that extend radially outward from its center supporting shaft 50. The fins 38 are secured to the supporting shaft 50 and as shown the fin 38 is a somewhat curved member that extends radially outward from the center shaft 50. The center portion of the fin as indicated by 52 extends radially outward the greatest amount (distance) and the fin 38 is tapered inwardly from the center portion 52 to the end portions 54, 56 with the ends 54 and 56 extending radially outward from the shaft 50 to a lesser degree (distance) than the center portion 52.

FIG. 3 illustrates the conveyor belt spreader 10 in operation and is arranged to disburse product pieces 12 laterally across the belt 20 as belt 20 conveys the product pieces 12 from the infeed end generally indicated by numeral 56 to the outfeed end generally indicated by the numeral 58. Typically a product such as meat that has been sliced into one-half to one inch cubes (portions or pieces 12) is conveyed by an infeed conveyor 60 from a slicer or other apparatus. The conveyor 60 will deposit the pieces 12 onto the belt 20 of the spreader 10 at the infeed end 56. The pieces 12 of the product on the conveyor 60 is most often in a closely spaced arrangement. That is, one piece 12 will be close to another piece 12. The conveyor 60 thus conveys and delivers or deposits on the spreader 10 the pieces 12 in a very closely spaced situation. As the product 12 is deposited on the belt 20 of the spreader 10, it will be conveyed on the spreader 10 in the direction indicated by arrow 14 by movement of the belt 20. As the belt 20 is in motion, the multi-fin paddle 36 is also rotatively driven in the direction indicated by arrow 39 and the fins 38 will be impacting the underside of the belt 20 to accelerate the belt 20 upwardly. The belt will accelerate downwardly as the paddle 36 rotates and the fin 38 travels out of the plane of contact. The fins 38 coming into engagement and out of engagement with the underside of the belt 20 provides a vertical reciprocal motion of the belt 20. The pieces 12 of the food product that are on the belt 20 in the vicinity of the multi-fin paddle 36 will have motion imparted to them as shown in FIGS. 4 and 5.

Figure 4:
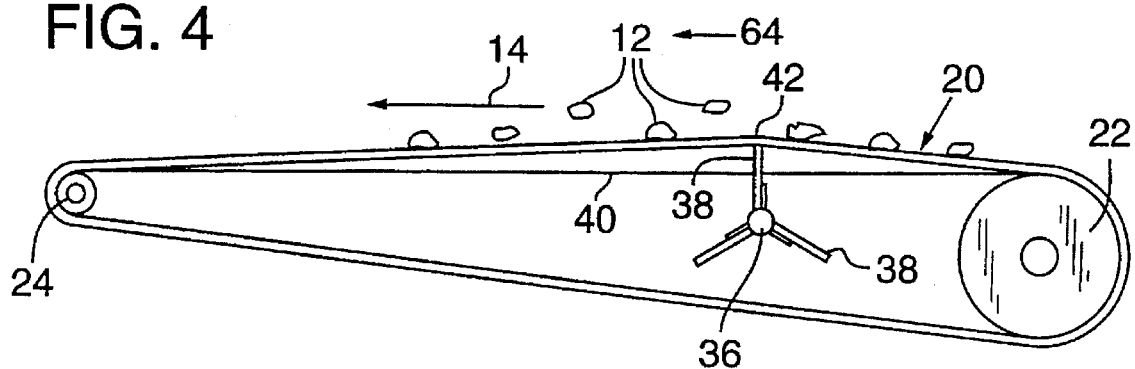
FIG. 4 is a schematic illustrating a product being conveyed along the conveyor belt spreader of FIG. 1.
Figure 5:
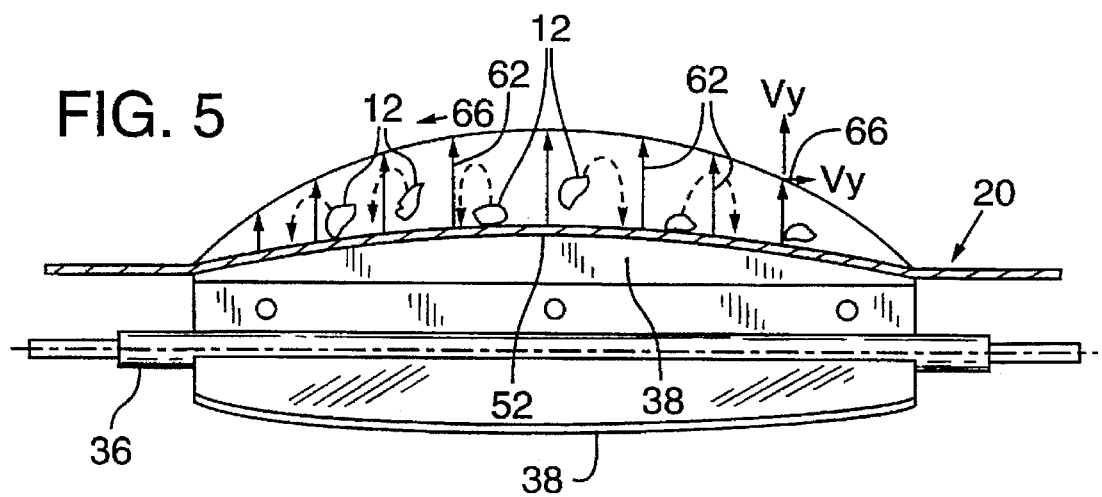
FIG. 5 is a view illustrating the trajectory of the product as it is being conveyed on the conveyor belt spreader of FIG. 1.

FIG. 4 illustrates the condition where the multi-fin paddle 36 has been rotated such that the fin 38 has accelerated and elevated the belt 20 to its maximum position. FIG. 4 shows the center portion 52 of the fin 38 in contact with the belt 20 with the belt moved to the upper position 42. This rapid movement of the belt 20 will cause the pieces of food product 12 to be projected off of the belt 20 for a short duration. As shown in FIG. 5, the belt 20 will conform substantially to the contour of the fin 38 of the paddle 36. The center portion of the belt, that is the portion that is in contact with the center portion 52 of the fin 38, will have the greatest movement and thus will project the piece of meat product or products in this vicinity the highest off of the belt 20. As seen in FIG. 5, the pieces 12 of the product will have a trajectory that is combination in part of the "Y" component indicated by arrows 62 and a "Z" component indicated by arrow 64 in FIG. 4. The food product 12 will be projected not only upwardly from the belt ("Y" component) and along the travel direction of the belt 20 ("Z" component) but will be laterally displaced, i.e., it will have an "X" component as indicated by arrow 66 in FIG. 5. The trajectory of the pieces 12 will cause the pieces 12 of the product to spread out transversely across the width of the belt 20 in a spaced relation.

There are occasions when the rate of travel of the belt 20 is too low for a paddle wheel 36 to have an effective impact to accelerate the belt upwardly and thus to provide a trajectory for the pieces 12 of the food product.

Figure 7:
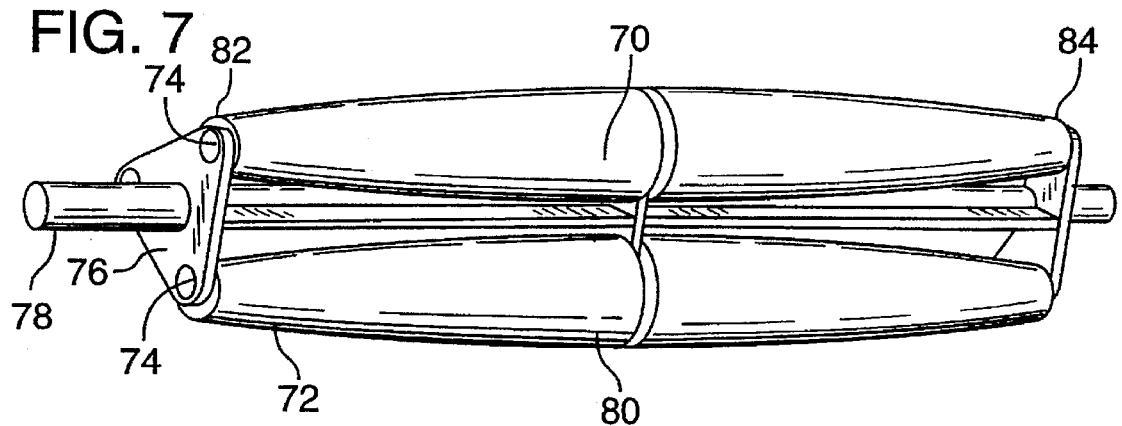
FIG. 7 is a view of a roller-type paddle utilized in the spreader of FIG. 1.
Figure 8:
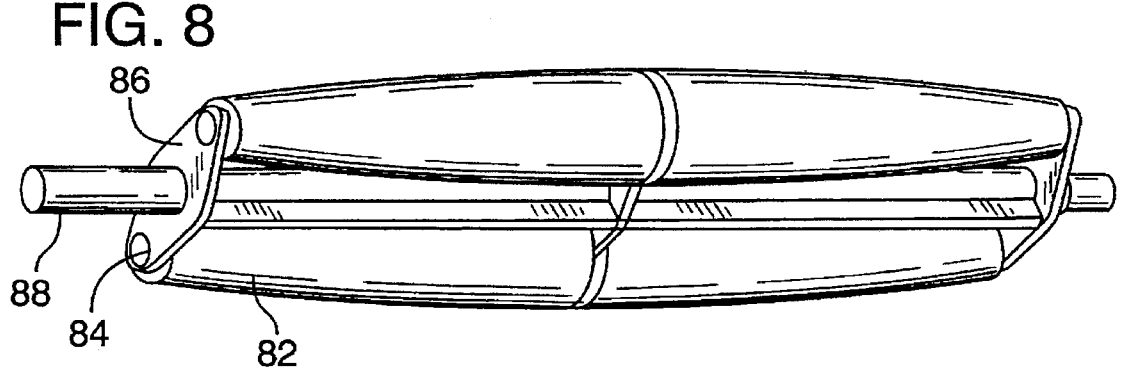
FIG. 8 is another variation of a roller-type paddle utilized in the spreader of FIG. 1; and, FIG. 9 is a view similar to FIG. 4 illustrating a product being conveyed along the conveyor belt spreader.

When the rate of travel of the belt 20 is such that the paddle wheel 36 (which has a peripheral speed of its fins 38 at about or equal to the same rate of travel as the belt 20) will not provide a sufficient rate of impact to rapidly accelerate the belt 20 upwardly, the finned paddle 36 is replaced by a roller-type paddle such as illustrated in FIGS. 7 or 8.

FIG. 7 is an illustration of a roller-type paddle 70 that has three sets of rollers 72 that have a similar contour as the fins 38 of the paddle wheel 36. The roller sets 72 are rotatably mounted on a shaft 74 which is mounted in a triangular-like plate 76 that is mounted substantially normal to the supporting shaft 78. The rollers of the roller set 72 are tapered such that the outer periphery of the ends 82 and 84 of the roller set 72 extend radially outward the least distance from the center of the supporting shaft 78 and the center portion 80 of the roller sets 72 have their peripheral edges extending radially outward the greatest amount from the center of the supporting shaft 78. The rollers of the roller set 72 rotate freely on the supporting shaft 74.

Figure 9:
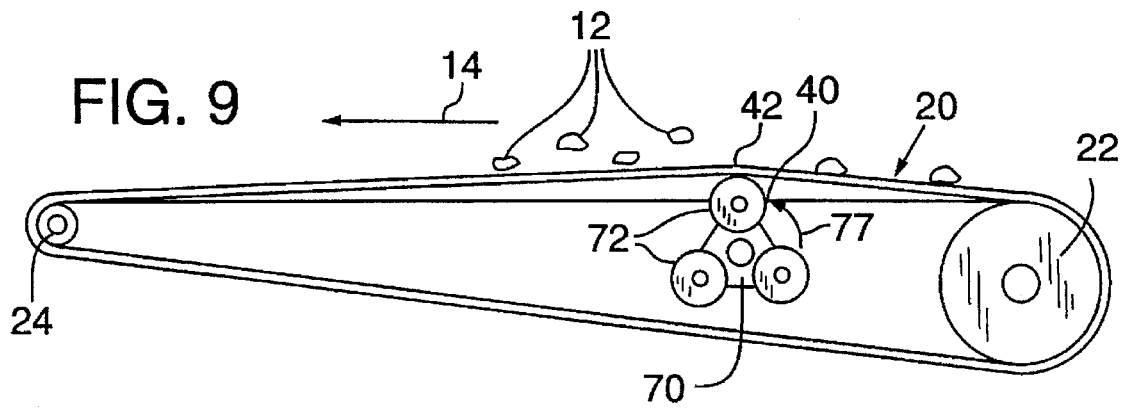

The roller-type paddle 70 of FIG. 7 replaces the multi-fin paddle 36 of the spreader 10 in the embodiment of FIG. 6. However, the drive mechanism is arranged to rotatably drive the roller-type paddle 70 such that the peripheral speed of the periphery of the roller set 72 can exceed the rate of travel of the belt 20. The roller-type paddle 70 thus may be rotated at a rate that is sufficient to cause a rapid acceleration or impacting of the belt 20 upwardly from its normal top position 40 to its extended position 42 as shown in FIG. 9. The rollers of the roller sets 72 will simply rotate on the shaft 74 when the rollers sets 72 come into contact with the underside of the belt 20. The roller-type paddle 70 is rotated in the direction indicated by the arrow 77 in FIG. 9 and thus avoids abrasive sliding action as may occur when using the fin-type paddle of FIG. 6.

FIG. 8 is another variation of the roller-type paddle and in FIG. 8 the roller type paddle 80 has two sets of rollers 82 that are tapered in a similar fashion to the rollers of the three roller sets 72 of FIG. 7. The roller sets 82 are rotatably mounted on a shaft 84 with a shaft 84 being supported in a bracket 86 that is mounted to the drive shaft 88 of the roller set 82. The dual rollers may be preferred to allow greater movement of the belt between impacts. In some cases, a single roller (or fin) paddle may be desirable although not shown.

Various forms of paddle wheels have been illustrated and described. It will be appreciated that the number of fins or roller sets extending radially outward may be varied from the examples illustrated and described. The number of fins 38 on the paddle 36 may be varied to be less or more than described and illustrated. Similarly the number of rollers sets on the roller-type paddles 70 and 80 may be varied to suit the requirements. The objective here is to provide a paddle configuration that achieves the desired effect. For any specific task the conveyor system can be designed specifically to achieve the desired effect. If different products are to be conveyed, in order to vary the action of the paddle, a control may be provided, e.g., to speed up or slow down the paddle wheels. Provisions can also be provided to change the curvature of the paddle wheel periphery or even additional paddles can be provided for movement into and out of engagement with the belt. It is also possible to provide a sensor or monitoring device that monitors the product exiting the conveyor and providing feed back to the control for making the desired adjustments.

An additional advantage of the device is the ability to perform continuous cleaning of the belt surface during the underneath carry around of the belt between passes. This ability to wash and/or scrape the belt allows for a continuous sanitary operation not available with vibratory conveyors.

The device considered herein provides a positive displacement that does not rely on particles colliding or randomly seeking voids in order to achieve the desired results. This favorably compares to vibratory conveyors wherein the rate of spread/singulation is controlled by modifying the frequency or amplitude of the vibration resulting in increased or decreased random agitation.

Those skilled in the art will recognize that modifications and variations may be made without departing from the true spirit and scope of the invention. The invention is therefore not to be limited to the embodiments described and illustrated but is to be determined from the appended claims.

I claim:

1. In combination, a taut conveyor belt having center and side edges conveying food product particles from one end of the belt to the other, the food product received on the conveyor in a crowded state covering a middle section of the belt wherein it is desirable to spread the food product particles evenly substantially over the width of the belt, and an apparatus for spreading the food product particles which comprises:

a paddle wheel rotatively mounted under the conveyor belt and having at least one paddle that engages, in an impacting motion, the underside of the belt section conveying said food product particles, and drive means rotatively driving the paddle, said paddle having an outer edge periphery that tapers inwardly from the belt center to the belt side edges whereby the center of the paddle impacts the belt to a greater degree than the side edges and thereby producing force vectors that spread the food product particles across the belt width, said belt having a conveyor speed matched to the sequence of the paddle impacts whereby each impact is focused on different segments of the food product and substantially avoids repetitive impacts on the same segment of the food product.

2. A combination as defined in claim 1, wherein the paddle is rotated at a speed such that the peripheral speed of the paddle substantially equals the conveyor speed to avoid relative sliding as between the periphery of the wheel at the belt.

3. A combination as defined in claim 1, wherein the paddle is convexly curved to provide X and Y components of the trajectory of the particles, the X component increasing relative to the Y component from the center toward the edges.

4. A combination as defined in claim 1, wherein the paddle is a rotatable roller set having a center portion and end portions, the center portion extending radially outward a greater distance than the end portions.

5. In combination, a taut elongate conveyor belt defining opposed ends and a width having center and side edges extending laterally across the belt, the belt conveying particles from one end of the belt to the other, and an apparatus for displacing the food product particles laterally on the conveyor belt which comprises:

an elongated paddle wheel positioned laterally relative to the belt, said wheel rotatively mounted under the conveyor belt and having at least one paddle that engages, in an impacting motion, the underside of the belt conveying said particles;

drive means rotatively driving the paddle, said paddle having an outer edge periphery that tapers in a lateral direction whereby as the paddle impacts the belt it thereby produces force vectors that displace the particles laterally along the belt width;

said belt having a conveyor speed matched to the sequence of the paddle impacts for controllably displacing the particles in a desired pattern on the belt.

6. A conveyor belt and displaying apparatus as defined in claim 5 wherein a belt mover moves the conveyor belt at a desired rate of conveyance, and the paddle wheel and paddles thereon are cooperatively configured and arranged relative to the speed of the belt conveyance and the placement of the particles thereon whereby the particles are displaced along the belt width in the desired pattern.

7. A conveyor belt and displacing apparatus as defined in claim 6 including a control controlling the drive means to thereby control the rate of rotation of the paddle wheel.

8. A conveyor belt and displacing apparatus as defined in claim 7 wherein the paddle periphery tapers from the center downward to the side edges for displacing particles placed on the center of the belt toward the side edges.

\* \* \* \* \*